March 1, 1932. S. I. SEMEL 1,847,987
CAMERA
Filed July 19, 1927 5 Sheets-Sheet 1
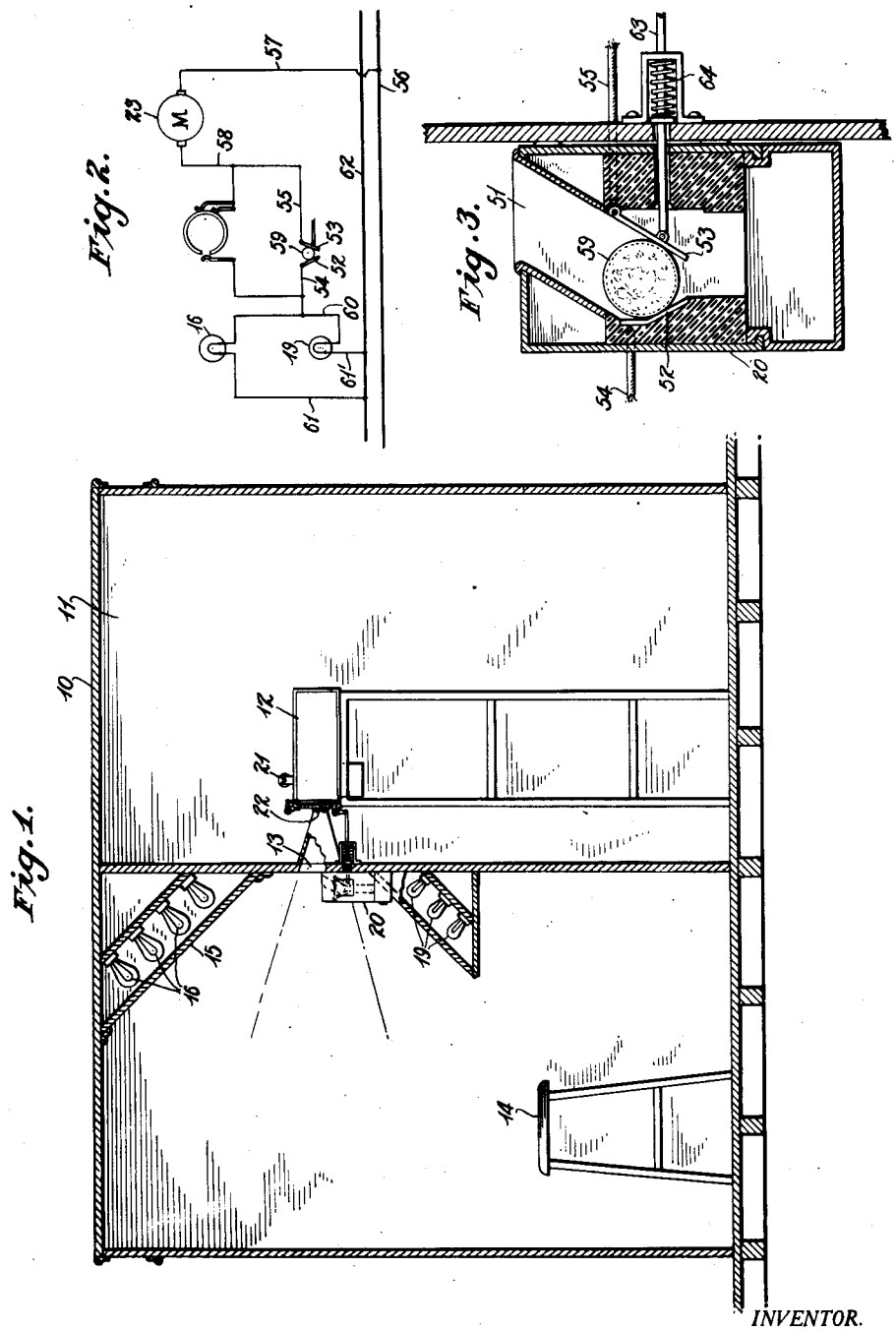
INVENTOR.
Samuel I. Semel
BY
ATTORNEYS

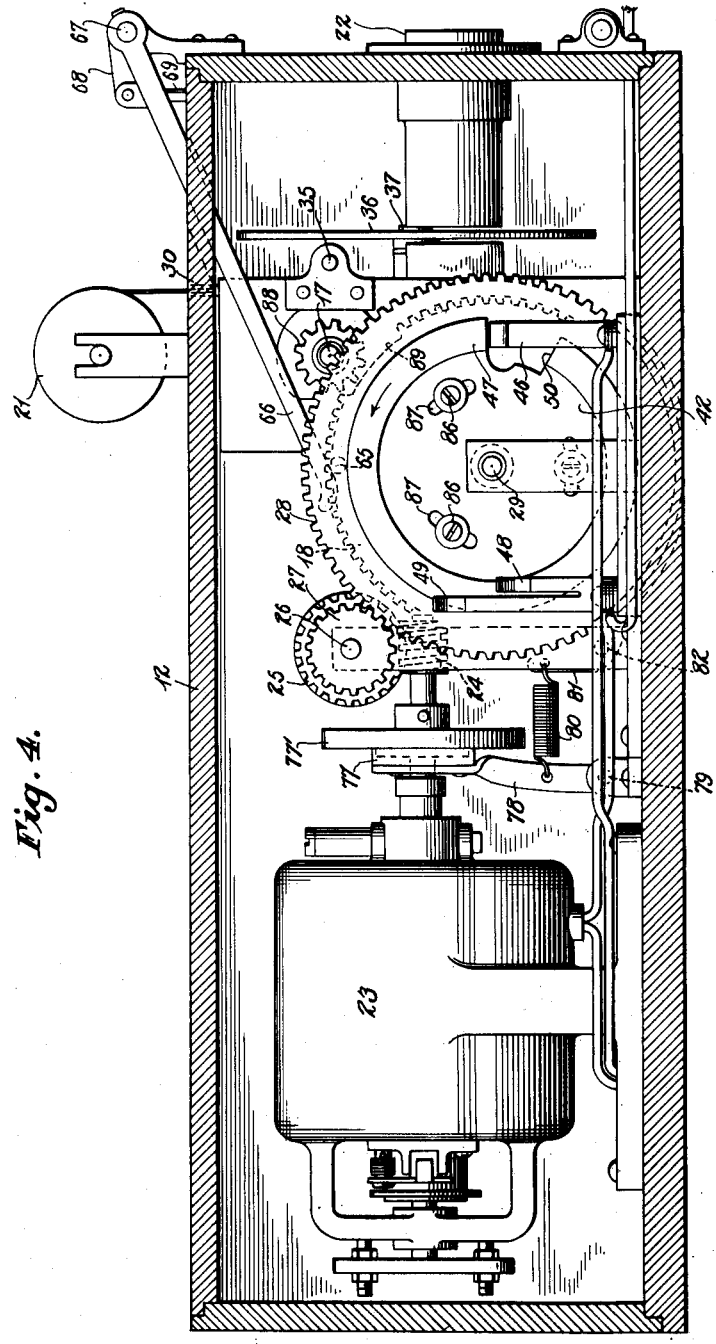

March 1, 1932. S. I. SEMEL 1,847,987
CAMERA
Filed July 19, 1927 5 Sheets-Sheet 3

INVENTOR.
Samuel I. Semel
BY
Dyrenforth, Lee, Chritton & Wiles
ATTORNEYS

March 1, 1932. S. I. SEMEL 1,847,987
CAMERA
Filed July 19, 1927 5 Sheets-Sheet 4
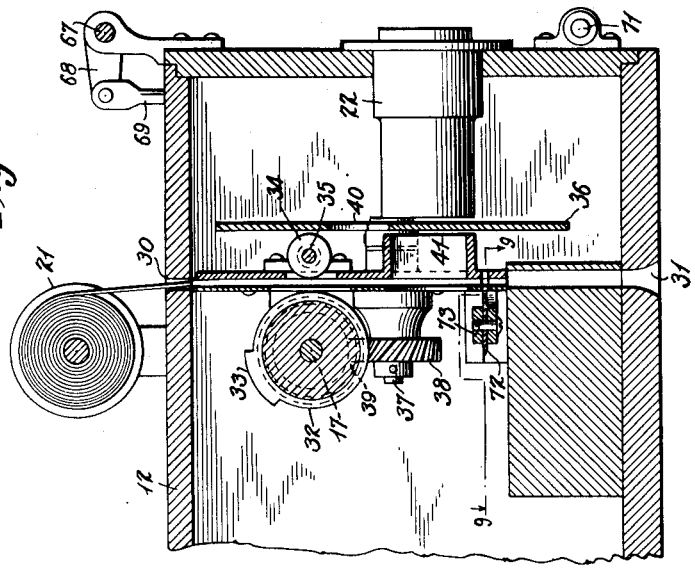
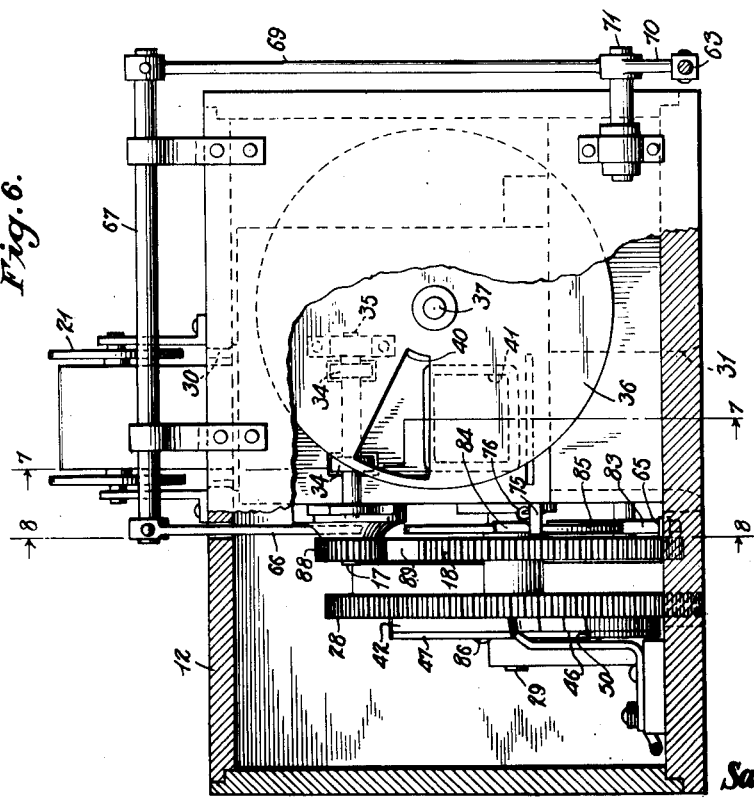
INVENTOR.
Samuel I. Semel
BY
ATTORNEYS March 1, 1932.  S. I. SEMEL  1,847,987
CAMERA
Filed July 19, 1927   5 Sheets-Sheet 5
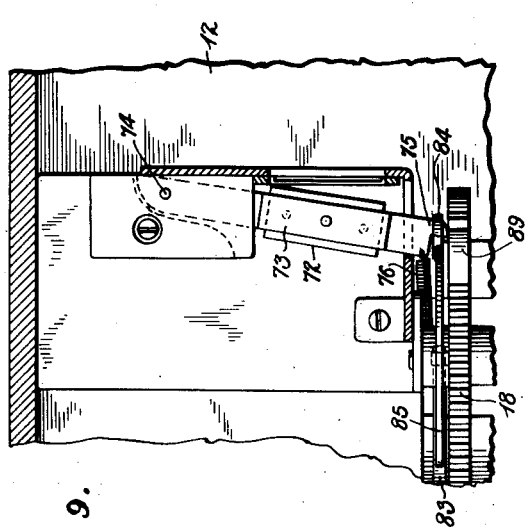
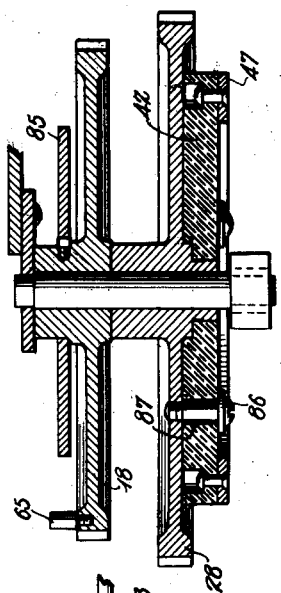
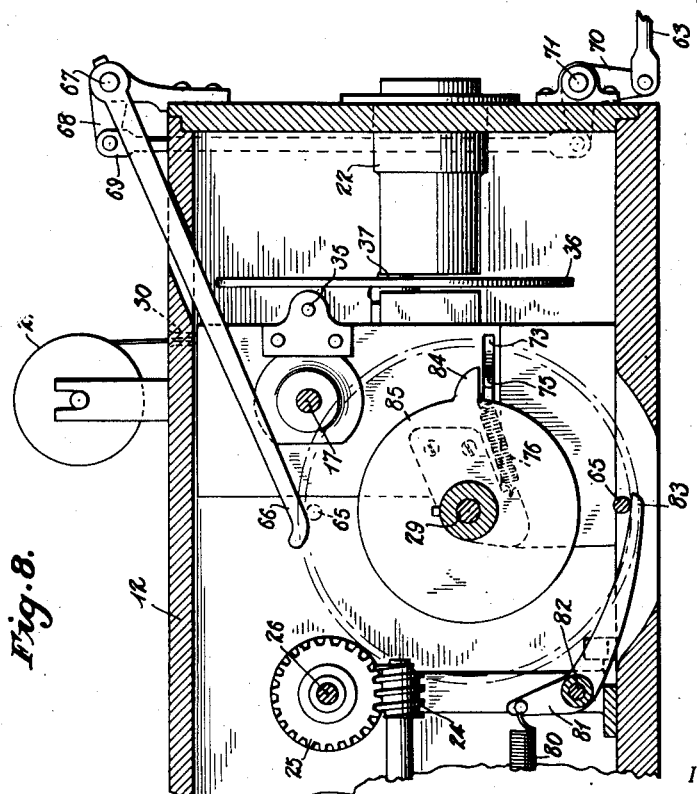
INVENTOR.
Samuel I. Semel
BY
ATTORNEYS Patented Mar. 1, 1932

1,847,987

UNITED STATES PATENT OFFICE

SAMUEL I. SEMEL, OF BROOKLYN, NEW YORK, ASSIGNOR TO PHOTOMOVETTE, INC., OF NEW YORK, N. Y., A CORPORATION

CAMERA

Application filed July 19, 1927. Serial No. 206,983.

The invention relates to coin controlled cameras and has as an object the provision of a camera which may be started into operation by the insertion of a coin and which will automatically make a series of exposures of a person or object placed in front of the camera and will automatically cease acting when a definite number of exposures have been made.

A further object of the invention is to provide a camera which will make a series of exposures automatically upon the insertion of a coin and when the last exposure is made will separate the exposed strip of sensitized material ready for development.

A further object of the invention is to provide a camera and cabinet therefor which will make a series of exposures when a coin is inserted and will automatically cause the illumination of the object and will cease functioning and extinguish the light after the completion of a series of exposures.

It is a further object of the invention to improve upon existing automatic cameras.

Further objects of the invention will appear from the following description when read in connection with the accompanying drawings showing an illustrative embodiment of the invention and wherein:

Figure 1 shows a vertical section through a cabinet with the camera in place;

Fig. 2 is a diagram of circuits.

Fig. 3 is a detail central vertical section through the coin slot upon an enlarged scale;

Fig. 4 is a section through the camera case showing the mechanism in side elevation;

Fig. 6 is an end view of the camera case partly broken away to expose a portion of the mechanism in elevation;

Figure 5:
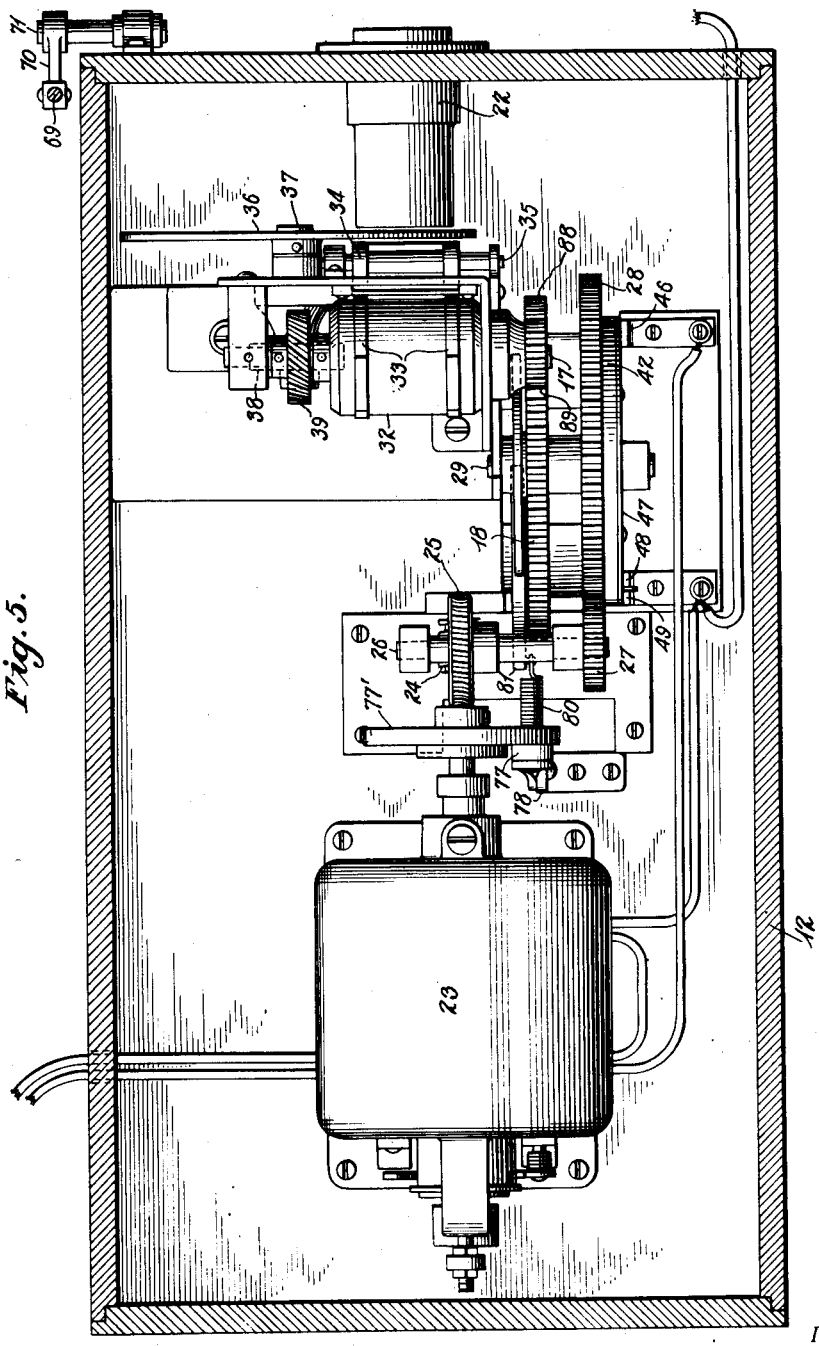
Fig. 5 is a plan view of the camera showing the case in section.

Figs. 7 and 8 are detail vertical sections on line 7—7 and 8—8 respectively of Fig. 6;

Fig. 9 is a detail horizontal section on line 9—9 of Fig. 7 showing parts in plan view;

Fig. 10 is a detail horizontal section through the center of the circuit-making disks shown upon an enlarged scale and as revolved 320° from normal.

As shown the device comprises a cabinet 10 having a camera-containing enclosure 11 housing a camera 12 and having an opening 13 through which the exposure is made.

To illuminate the object, such as a person seated upon a stool 14, there is shown a skylight, as ground glass 15, which may be illuminated by lamps 16, and a shadow softening light provided with lamps 19.

The cabinet is provided with a coin-receiving box 20 convenient to the person desiring a photograph taken.

To receive the exposures, there is provided a reel 21 to hold sensitized material adapted to be moved past the field of a lens 22, desirably provided with a focusing mount of the usual form, which lens is housed in front of the camera casing 12.

To operate the camera to produce a series of exposures, there is shown a motor 23 operating a worm drive 24, 25, the worm wheel 25 shown as mounted on the shaft 26 bearing a pinion 27 driving a large gear wheel 28 mounted upon the shaft 29. The sensitized material from reel 12 is led through a slot 30 through the field of the lens and from the slot the exposed material is allowed to escape through the lower opening 31 shown in Figure 7.

To intermittently feed the sensitized material in the slot 30 between exposures, the shaft 17 is shown, particularly in Figure 7, as supplied with a feeding cylinder 32 having projecting segments 33 adapted to contact with the sensitized material and feed the same downwardly once during each revolution of the shaft 17, idle roller 34 being provided mounted upon a shaft 35 on the front wall of the slot 30 to assist in the feeding operation.

To provide successive exposures of the sensitized material, there is shown a shutter disk 36 mounted upon the shaft 37 bearing pinion 38 driven by a pinion 39 mounted on shaft 17. The shutter disk 36 is shown as provided with an opening 40 to cause the exposure of the sensitized material when the opening 40 passes the framing opening 41.

To control the action of the motor, there is shown a disc 42 mounted upon gear 28. Current to the motor is fed through a brush 46 which during the revolution of the disc 42 contacts with a strip of conducting material 47 mounted upon disc 42, the circuit being completed through brushes 48, 49 bearing upon another portion of the annular strip of material 47.

To normally break the current to the motor 23, strip 47 is shown as interrupted at 50 so that the current is broken between brushes 46 and 48, 49. To close the circuit to initiate the making of a series of exposures, the coin slot 51 in casing 20 is shown as provided with a pair of contacts 52, 53 connecting the wires 54, 55 adapted to close the circuit through the motor and through the lamps 16 in shunt of the strip of material 47.

When the coin is inserted in the slot, a circuit is completed from line wire 56, through wire 57, motor 23, wires 58, 55, contact 53, coin 59, contact 52, wires 54, 60, lamps 16, 19, wires 61, 61' to line wire 62. This causes the motor to be set into operation with consequent revolution of the disc 42 and completion of the circuit through brush 48, strip 47 and brushes 48, 49. The two brushes 48, 49 are provided in order to bridge the gap 50 while passing the brushes in succession.

To release the coin from the slot and allow the same to fall into the bottom of the casing 20, the contact 53 is shown as pivotally mounted and as held in its normal position shown in Figure 3 by means of a rod 63 spring pressed to normal position by means of a spring 64. After the disc 42 is set into operation, a pin 65 carried by the gear 18, shown in Figure 8 in a dotted line position after about 90° of revolution of gear 18, contacts with a finger 66 fixed on rock-shaft 67, operating through bell crank 68, upon link 69 and thereby acting upon a bell crank 70 mounted upon stub shaft 71 projecting from the casing 12 to exert a pull upon rod 63 to overcome spring 64 to drop the coin, the current now being completed to the motor and lamp 17, through brushes 46, 48 and 49.

To sever the strip of sensitized material after completion of the series of exposures, there is shown a knife 72, shown in detail in Figure 9, mounted upon an arm 73 pivoted at 74 closely adjacent to the plane of the sensitized material, so that one corner of the knife will contact first with the sensitized material and progressively sever the material as the knife is pressed toward the same.

To cause movement of the arm 73, its end 75 projects into the path of cam 84, which cam 84 is carried by a disc 85 mounted on shaft 29. The arm 73 is shown as held in its retracted position by means of a spring 76 anchored to the arm 73 and to the frame of the device.

To effect prompt stoppage of the motor when the current is broken there is shown a brake 77 carried by an arm 78 pivoted at 79 and adapted to be pulled upon by a spring 80 anchored to the arm and to a bell crank 81 pivoted at 82 and having a projection 83 projecting into the path of the pin 65. The brake 77 may thus be pulled into contact with the brake disc 77' mounted upon the shaft of the motor.

To provide a timing adjustment of the disc 42 upon the gear 28, the disc is shown as mounted upon the gear by means of screws 86 projecting through slots 87 in the disc whereby the disc may be rotated slightly upon the gear.

The timing of exposures depends upon the speed of the shutter disc 37. Should this shutter begin to operate at once when the motor is started and before it gets up to normal speed the first exposure would be overtimed. To avoid this defect the gear 18 which drives shaft 17 through pinion 88 has teeth omitted as indicated at 89 in which gap the teeth of pinion 88 stand when the device is at rest. Therefore the shutter and strip feed do not start until after the motor has started and come to full speed. The number of teeth on gear 18 and pinion 88 is so adjusted that the desired number of exposures will be made for one revolution of shaft 29.

The operation of the device is as follows: When a coin is inserted into slot 51 current is completed through the motor by the described path causing the same to start with consequent revolution of gears 28 and 18, which gears will make a single revolution, thus revolving the shutter to expose the strip of sensitized material, which will be stationary when the shutter opening passes the framing aperture 41, and will be moved by the segments 33 between each of the exposures. When the motor begins to revolve, the current will be completed through the brushes and the contact strip in shunt of the coin, and after approximately one-half revolution of the shaft 29, the coin will be dropped, thus breaking the circuit at the coin slot, the motor being continued in operation by virtue of the brushes and contact strip, the lamps 16 being also lighted.

When the series of exposures has been completed just before the return of the gap 50 to circuit breaking position, the cam 84 will cause the knife to operate to sever the strip which may fall from the camera casing into any light tight receiving receptacle, or the whole portion 11 of the cabinet may be formed to exclude light. The camera is then ready for a subsequent operation.

Minor changes may be made in the physical embodiment of the invention within the scope of the appended claims without departing from the spirit thereof.

I claim:

1. A camera comprising in combination, a rotary shutter, film feeding means and a lens, a motor, a gear driven by said motor having a portion of its teeth omitted, a pinion for operating said shutter and film feeding means, said pinion standing in the interrupted portion of said gear while said motor is at rest whereby the first period of action of said motor will leave said shutter and film feeding means at rest until the motor arrives at full speed.

2. A camera comprising, in combination, a revoluble shutter and a lens, means for feeding sensitized material through the field of said lens between exposures thereof by said shutter, a motor for operating said shutter and feeding means, a contact strip driven by said motor having a break therein, a brush normally standing in said break, means for making a circuit to said motor, a circuit through said motor, brush and contact strip in shunt of said means, means for driving said shutter to make a series of exposures before said brush again falls into said break to break the circuit through said motor.

3. A camera comprising, in combination, a rotary shutter and a lens, a motor, a gear actuated by said motor, a second gear driven by said first named gear, a pinion driven by said second named gear for actuating said shutter, said second named gear having teeth omitted therefrom, the pinion for driving said shutter normally standing in the gap provided by such omission whereby said shutter will remain at rest until said motor has gathered speed.

4. A camera comprising, in combination, an electric motor, a driving shaft, a reducing gear for actuation of said shaft by said motor, a driving gear fixed on said shaft having a portion of its teeth omitted, a driven shaft having a pinion coacting with said driving gear, intermittent sensitive-strip feeding means fixed on said driven shaft, a rotary shutter, gearing actuated by said driven shaft to drive said shutter, means to close a circuit through said motor, means actuated by the motor to break said circuit after one revolution of said driving gear and means to stop the motor and driving gear with the teeth of said pinion standing in said teeth omitted portion.

5. A camera comprising, in combination, an electric motor, a driving gear actuated by said motor and having interruption in its teeth, a driven pinion coacting with said gear, intermittently acting strip feeding means and a shutter actuated by said pinion, manually operated means to close the circuit through said motor, means actuated by the motor to close a secondary circuit therethrough, means actuated by the motor to break said first named circuit, means actuated by the motor to break said secondary circuit after one revolution of said driving gear and means to stop movement of the driving mechanism with the teeth of said pinion in said interruption.

SAMUEL I. SEMEL.